United States Patent [19]

Takeda et al.

[11] Patent Number: 4,851,181
[45] Date of Patent: Jul. 25, 1989

[54] LIGHT WATER MODERATION TYPE NUCLEAR REACTOR

[75] Inventors: Renzo Takeda, Hitachi; Kanji Kato, Katsuta; Tadahiro Ohnishi, Hitachi; Sadao Uchikawa; Hiromi Maruyama, both of Katsuta; Motoo Aoyama, Hitachi; Kikuo Umegaki, Hitachi; Yasunori Bessho, Hitachi; Motomasa Fuse, Hitachi; Michiro Yokomi, Ibaraki, all of Japan

[73] Assignee: Hitachi, Ltd., Tokyo, Japan

[21] Appl. No.: 123,542

[22] Filed: Nov. 20, 1987

Related U.S. Application Data

[63] Continuation of Ser. No. 800,266, Nov. 21, 1985, abandoned.

[30] Foreign Application Priority Data

Nov. 28, 1984 [JP] Japan ................... 59-251389

[51] Int. Cl.$^4$ ............................................... G21C 1/00
[52] U.S. Cl. ........................................ 376/267; 376/349
[58] Field of Search ............... 376/171, 172, 173, 209, 376/212, 267, 346, 348, 349

[56] References Cited

U.S. PATENT DOCUMENTS

| | | | |
|---|---|---|---|
| 3,575,803 | 4/1971 | Greebler | 376/267 |
| 3,658,644 | 4/1972 | Lang | 376/172 |
| 3,844,886 | 10/1974 | Crowther | 376/267 |
| 3,859,165 | 1/1975 | Radkowsky et al. | 376/346 |
| 3,910,818 | 10/1975 | Sofer | 376/267 |
| 3,959,070 | 5/1976 | Woods | 376/267 |
| 3,986,924 | 10/1976 | Motoda | 376/267 |
| 4,293,380 | 10/1981 | Robbins | 376/212 |
| 4,451,427 | 5/1984 | Ross et al. | 376/267 |
| 4,716,007 | 12/1987 | Carlson et al. | 376/209 |

OTHER PUBLICATIONS

Oldekop et al., "Gen. Features of Adv. P.W.R.'s with Improved Fuel Utilization," Nuclear Tech., vol. 59, pp. 212–227, Nov. 1982.

Primary Examiner—Deborah L. Kyle
Assistant Examiner—Richard W. Wendtland
Attorney, Agent, or Firm—Antonelli, Terry & Wands

[57] ABSTRACT

In a light water moderation type nuclear reactor with the once-through method, the reactor core is divided into a central area and a peripheral area by a partition member, a first fuel assembly is arranged in the central area (high conversion area) and a second fuel assembly is arranged in the peripheral area. The ratio ($r_{H/U}$) of the number of hydrogen atoms to that of uranium atoms in the central area is smaller than that of the ratio in the peripheral area and the second fuel assembly in the peripheral area is formed of fuel rods of the first fuel assembly having been previously burned in the central area and moved into the peripheral area. The plutonium production increases and uranium consumption is reduced during the first half of the lifetime of the fuel rods in the high conversion area with the take-up burn up increasing during the second half of the lifetime of the fuel rods in the burner area.

22 Claims, 9 Drawing Sheets

LIGHT WATER MODERATION TYPE NUCLEAR REACTOR

This is a continuation of application Ser. No. 800,266 filed Nov. 21, 1985 now abandoned.

BACKGROUND OF THE INVENTION

1. Field of the Invention

The present invention relates to a light water moderation type nuclear reactor, more particularly to a pressurized water type nuclear reactor with a once-through method or a boiling water type nuclear reactor with a once-through method.

2. Description of the Prior Art

The method of utilizing the fuel materials in a light water moderation type nuclear reactor (hereinafter referred to as a light water reactor) is largely classified into the once-through method and the reprocessing and recycling method.

With the once-through method the light water reactor uses the enriched uranium and in this method none of the fuel materials contained in the used fuel rods which are taken out of the light water reactor is reused (recycled) in the light water reactor. This once-through method or system cycling cost when cost of the reprocessing fuel is higher than that of the enriching uranium.

Additionally, the purpose of the reprocessing and recycling method or system is to make new fuel rods by reprocessing fuel materials in the used fuel rods and to charge those new fuel rods into the light water reactor to reuse the fuel materials.

One method to effectively use the fuel materials by the once-through method is to greatly increase the take-out burnup from the fuel assembly, that is, to realize a high degree of the burnup. The fuel assembly includes many fuel rods. It is required to raise the enrichment of the enriched uranium so as to achieve the high degree of the burnup. However, to realize such a raised enrichment of the enriched uranium, the following problems occur.

In the center of the reactor core of the light water reactor there are the fuel assemblies with large difference in the neutron infinite multiplication factor because of a high enrichment of new fuel assemblies and the large take-out burnup. A difference in the output power share proportions of the individual fuel assemblies, therefore, the output power mismatch grains larger and also the output power peaking becomes larger.

Further, as the enrichment increases, the surplus reactivity which has to be controlled in the initial stage of the burning increases. Therefore, the conventional fuel assembly using the fuel rods containing gadolinia has to increase the number of the fuel rods which contain the gadolinia.

The fuel rods of reactor core of the conventional pressurized water type nuclear reactor have uniformly the ratio ($r_{H/U}$) of the number of hydrogen atoms to the number of fuel material atoms of about 2.0. The characteristics of the reactor core of the conventional pressurized water type nuclear reactor is represented by the curve $P_5$ (a dashed line) as shown in FIG. 11. The initial enrichment of the fuel rods of the conventional light water reactor is raised until the take-out burnup $E_b$ represented by the curve $P_5$ as shown in FIG. 11 is realized.

With this reactor core the initial neutron multiplication factor is large, and in order to suppress this, a large amount of the burnable poison material such as gadolinium has to be put in the fuel assemblies at the expense of the neutron economy.

Furthermore, the mingling of the fuel assemblies, which are much different in the neutron multiplication factor, into the reactor core makes it difficult to flatten the output power distribution. The maximum burnup is restricted by the fuel rods having the peak power with the result of the lowered average take-out burnup.

The mismatch in the neutron multiplication factor of the conventional light water reactor is large, therefore the average take-out burnup from the fuel assembly can not be made high. The realization of the high degree of the burnup can not realize is impossible.

The conventional light water reactor has a uniform ratio ($r_{H/U}$) (about 2.0) of the number of hydrogen atoms to the number of fuel material atoms in the reactor core.

The variation of the neutron multiplication factor in the conventional light water reactor is shown the curve $P_4$ (a dashed line) shown in FIG. 10. In the conventional light water reactor the fuel assemblies are exchanged for the new fuel assemblies at the burnup $E_c$. Namely the average take-out burnup of the fuel rods charged in the reactor core of the conventional light water reactor is the burnup $E_c$. The amount of the charged fuel in the conventional light water reactor is the same throughout the reactor core.

The average take-out burnup $E_c$ of the fuel rods in the reactor core is not made larger, therefore the uranium saving can not be achieved in the conventional light water reactor.

From the standpoint of the effective use of the uranium resources, a light water reactor has been proposed in which the conversion from uranium-238 to a fissile product (plutonium-239) is improved.

In the "General Features of Advanced Pressurized Water Reactors with Improved Fuel Utilization" by Werner Oldekop et al in the Nuclear Technology, vol. 59, November 1982 P. 212–227, a high conversion reactor (HCR) was proposed to lower the ratio ($V_H/V_F$) of the volume of light water and the volume of fuel material in the reactor core of the light water reactor from conventional 2.0 to 0.5 and raise the average energy of neutrons to make the plutonium conversion rate higher than 0.9. As a construction to bring about this ratio ($V_H/V_F$) of the volume of light water and the volume of fuel material of 0.5 a dense lattice construction is employed.

Because of the dense lattice construction, the high conversion reactor (HCR) has following serious problems therein raised from the aspects of the heat transfer or the floating. Such problems are as follows, for example, the pressure drop in the reactor core becomes about four (4.0) times as much as that of the conventional light water reactor, or by the unexpected accident with coolant loss the emergency coolant hardly enters into the reactor core.

The high conversion reactor (HCR) including this example aims at an effective utilization of the fuel material by reprocessing and recycling the fuel assemblies taken out of the reactor core. In the high conversion reactor (HCR) the fuel cycle including the steps of the fuel reprocessing, the fuel reworking, etc. must be completed.

Furthermore, even if the above described problems in the high conversion reactor (HCR) were solved therein, the utilization quantity of uranium in the high coversion reactor (HCR) may be not reach more than about two-and-a-half (2.5) times as much as that of the conventional light water reactor.

SUMMARY OF THE INVENTION

One object of the present invention is to provide a light water moderation type nuclear reactor wherein an amount of the natural uranium required to develop unit energy in the light water reactor can be reduced without reusing the fuel materials.

Another object of the present invention is to provide a light water moderation type nuclear reactor wherein uranium consumption in the reactor core can be reduced efficiently.

Further, an object of the present invention is to provide a light water moderation type nuclear reactor wherein a take-out burnup can be increased efficiently.

Still another object of the present invention is to provide a light water moderation type nuclear reactor wherein a production of the plutonium in the fuel rods can be increased during the first half of the life time of the fuel rods.

Furthermore, an object of the present invention is to provide a light water moderation type nuclear reactor wherein fissile materials in the fuel rods can be burned effectively during the second half of the life time of the fuel rods.

A further object of the present invention is to provide a light water moderation type nuclear reactor wherein a mismatch in the neutron multiplication factors among the fuel rods can be made relatively small.

Still another object of the present invention is to provide a light water moderation type nuclear reactor wherein a ratio of the number of hydrogen atoms to that of fuel material atoms can be adjusted minutely.

Still a further object of the present invention is to provide a light water moderation type nuclear reactor wherein thermal neutrons can be utilized effectively.

The present invention has a feature that in a radial direction of the reactor core, areas having different average densities of the fuel rods per unit cross-sectional area are provided, and the fuel rods which are arranged in a first area with larger average density of the fuel rods per unit cross-sectional area are subsequently moved to a second area where the fuel rods are arranged in the area with smaller average density of the fuel rods per unit cross-sectional area, the fuel rods being arranged in the second area with smaller average density of the fuel rods per unit cross-sectional area having bean burned in the first area with larger average density of the fuel rods per unit cross-sectional area.

For increasing the plutonium production in the reactor core it is only required to shift the neutron energy spectrum to the high energy side in order to raise the rate of capturing and absorbing neutrons by uranium-238. For this it is necessary to lower the ratio of the number of hydrogen atoms to that of uranium atoms which has the largest moderation power for neutron.

With a once-through light water reactor it is necessary to burn up most effectively plutonium-239, plutonium-241 and the enriched uranium-235 that are produced as the fissile materials.

This requires that methods for improving the moderation of neutrons and raising its rate of absorption of the fissile materials by increasing the proportion of the thermal neutrons. It can be achieved by increasing the ratio of the number of hydrogen atoms to that of uranium atoms.

This means that, as far as the neutron moderation is concerned, namely the ratio of the number of hydrogen atoms to that of uranium atoms, the measure for increasing the production of plutonium and the measure for the high efficiency burnup of the fissile materials (plutonium-239, plutonium-241 and uranium-235) are measures.

The present invention aims to realize in the same reactor core the above contradicting measure at the same time to produce more of the fissile materials and, furthermore, to utilize the fissile materials more efficiently for the saving of uranium consumption and the increasing burnup which will be described below in reference to FIG. 12 and FIG. 13.

A reactor core 45 is divided radially by partition members 49 into a first area 46, a second area 47, . . . , and a Nth area 48 as shown in FIG. 12. The ratio of the number of hydrogen atoms to that of uranium atoms, i.e., $r_{H/U}$ in the first area is $a_1$, $r_{H/U}$ in the second area is $a_2$, and $r_{H/U}$ in the Nth area is $a_N$; and the following relations hold therein:

$$a_1 < a_2 < \ldots < a_N$$

The value of $a_1$ is made to be between 1.0 and 2.0 which is smaller than the ratio of the number of hydrogen atoms to that of uranium atoms of the conventional light water reactor, and the value of $a_N$ is made to be over 5.0 which is larger than the value of the conventional light water reactor.

New fuel rods with the burnup of 0 are charged at first to the first area 46 and it is burned to the shift point $E_1$ as shown in FIG. 13. Next, the fuel rods which have been burned to the shift point $E_1$ are moved to the second area 47. When those fuel rods are burned to the shift point $E_2$ in the second area 47, those fuel rods are moved to the third area.

New fuel rods which were first charged to the first area 46 move successively from the first area 46, to the second area 47, . . . , to the Nth area 48 during their life time by carrying out the above mentioned moving at each fuel exchange, and at the time of the (N−1)th fuel exchange the fuel rods which have been burned to the point $E_N$ in the Nth area are taken out.

Accordingly during the first half of the life time of the fuel rods the fuel rods stay in the areas where the ratio of the number of hydrogen atoms to that of uranium atoms is small and the increased production of plutonium in the fuel rods is attempted. Since during the second half of the life time of the fuel rods the fuel rods stay in the area where the ratio of the number of hydrogen atoms to that of uranium atoms is large, it is possible to effectively burn the fissile materials in the fuel rods.

FIG. 14 shows the variation in the conversion ratio (the ratio of the atom number concentration of the initial uranium-235 to that of the fissile materials after burning for the fuel rod) of about 4% uranium enrichment with the ratio of the number of hydrogen atoms to that of uranium atoms as the parameter.

When the ratio of the number of hydrogen atoms to that of uranium atoms in the first area 46 is about 1.1, about 95% of the fissile materials in the initial uranium-235 atoms number concentration remain after the burning 30 GWd/t.

The partition members 49 shown in FIG. 12 are the boundary layers that divide areas 46, 47 and 48, and the partition members 49 are provided as separators so that between the areas there is no flow of the coolant (light water) through them. The material for those partition members 49 is selected from a low neutron absorption, for example, zircalloy, etc.

FIG. 13 shows a variation in the neutron multiplication factor for the burnup during the life time of the fuel rods according to the present invention. Even if the average neutron multiplication factor does not meet the critical condition in the first area 46, it may be designed so as to make the average neutron multiplication factor for whole area meet the critical condition. After second area 47, if necessary, the gadolinium is added to each of the areas 47 and 48 to control the reactivity.

FIG. 15A, FIG. 15B and FIG. 15C show the power densities for the areas 46, 47 and 48 in the reactor core according to the present invention and also the radial distribution of the flow rate of the coolant (light water).

The power density is higher in the area nearer to the center because that area is charged with denser fuel rods. The flow rate of the coolant is adjusted by an orifice provided at the coolant inlet of the reactor core so that the temperature of fuel rods and the temperature of the fuel cladding tube in each area will not exceed the standard value in the design.

Furthermore, at the reactor core where the coolant is boiled, it is also possible to adjust the ratio of the number of hydrogen atoms to that of uranium atoms by adjusting the coolant flow rate to change the void factor in each of the areas.

According to the present invention during the time from charging the fuel rods to the reactor core to subjecting the fuel rods to discharging treatment, the fuel rods are taken out and the burnup of the fuel rods can be improved trememdously, allowing the effective utilization of the fuel materials.

DETAILED DESCRIPTION OF THE PREFERRED EMBODIMENTS

Figure 1:
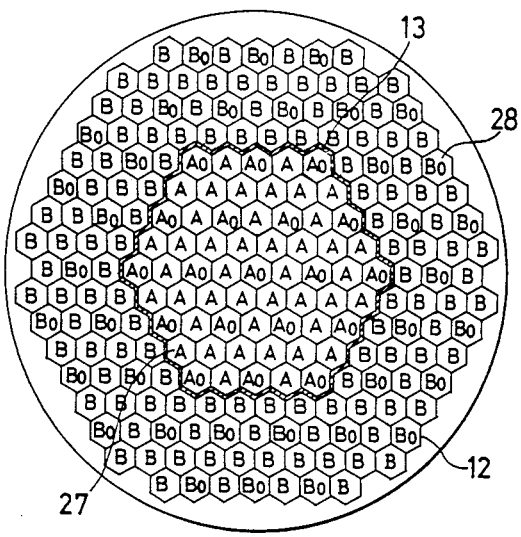
FIG. 1 shows a horizontal cross section of the construction of a reactor core of a pressurized water type nuclear reactor which is a preferable embodiment of the present invention.

An embodiment of the present invention applied to a pressurized water type nuclear reactor which belongs to the light water reactor will be explained with reference to FIG. 1. and FIG. 2. This embodiment is the pressurized water type nuclear reactor which divides a reactor core into two areas.

A pressurized water type nuclear reactor 1 includes a reactor pressure vessel 2 having a reactor core 12. The reactor pressure vessel 2 has on its wall face an inlet nozzle 3 and an outlet nozzle 4. The reactor pressure vessel 2 is provided with a sealed lid 5. A substantially cylindrical reactor core shroud 6 is hung from the shelf of the reactor pressure vessel 2 which is close to the sealed lid 5 at the top thereof. Baffles 7 are attached to the reactor core shroud 6 at its lower section.

A lower reactor core support plate 8 which is provided with holes to receive the lower ends of a fuel assembly A and a fuel assembly B is attached to the lower end of the reactor core shroud 6. An upper reactor core support plate 9 which is provided with holes to receive the upper ends of the fuel assembly A and the fuel assembly B is supported on the upper support plate 11 with large beams by means of a plurality of support columns 10. A plurality of guide tubes 26 are provided between the upper support plate 11 and the upper reactor core support plate 9. Each guide tube 26 is provided with openings 33.

The reactor core 12 is formed at the lower section and the inside of the reactor core shroud 6. The reactor core 12 comprises of many fuel assemblies A, many fuel assemblies B and a tubular partition member 13. The tubular partition member 13 is made of zircalloy (zirconium alloy).

In this embodiment the reactor core 12 is divided by the tubular partition member 13 into two areas, namely an inside central area (a high conversion area) 27 and an outside peripheral area (a burner area) 28. The fuel assembly A is arranged in the central area 27 inside of the partition member 13. The fuel assembly B is located in the peripheral area 28 outside of the partition member 13.

Figure 3:
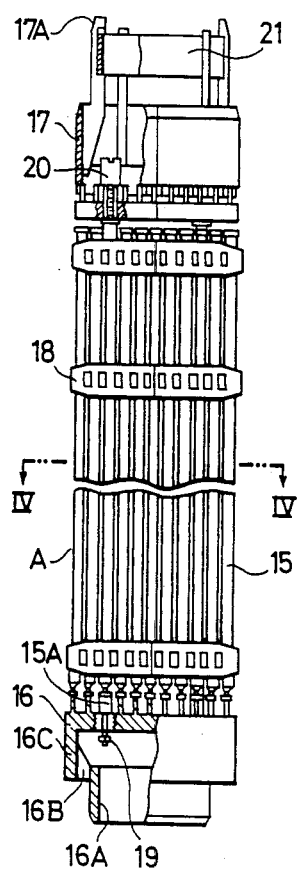
FIG. 3 is a side view of a fuel assembly charged in a central area of FIG. 1.
Figure 4:
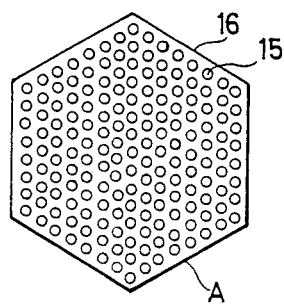
FIG. 4 is a cross section along a line IV—IV of FIG. 3.

The fuel assembly A includes, as shown in FIG. 3 and FIG. 4, a plurality of fuel rods 15, a lower tie plate 16, an upper tie plate 17 and spacers 18. 21 denotes a handle. The shapes of the lower tie plate 16 and the upper tie plate 17 are regular hexagon form, respectively. Both ends of the fuel rods 15 are supported respectively by the lower tie plate 16 and the upper tie plate 17.

The lower tie plate 16 has in its inside a cylindrical section 16A, and the inside cylindrical section 16A is constituted with a plurality of connecting plates 16B. The connecting plates 16B are arranged radially and connect the inside cylindrical section 16A to an outside cylindrical section 16C.

The fuel rods 15 are arranged to form a regular hexagon as shown in FIG. 4. Some of the fuel rods 15 function as the tie rods 15A. Both ends of the tie rods 15A pierce the lower tie plate 16 and the upper tie plate 17 respectively. The lower end of the tie rods 15A is secured by a nut 19 and the uppers end of the tie rods 15A are secured by a tightening nut 20.

The upper tie plate 16 and the lower tie plate 17 are connected respectively by those tie rods 15A. The fuel rods 15 (including the tie rods 15A) are filled with fuel pellets which are enclosed in the cladding tubes made of zilcalloy.

The fuel pellets include uranium-235 as a fissile material. In the axial direction of the bundle of the fuel rods 15 a plurality of spacers 18 are provided. The spacers 18 prevent the adjacent fuel rods 15 from contacting mutually and secure flow the channels among the fuel rods 15 for the coolant (light water).

Figure 5:
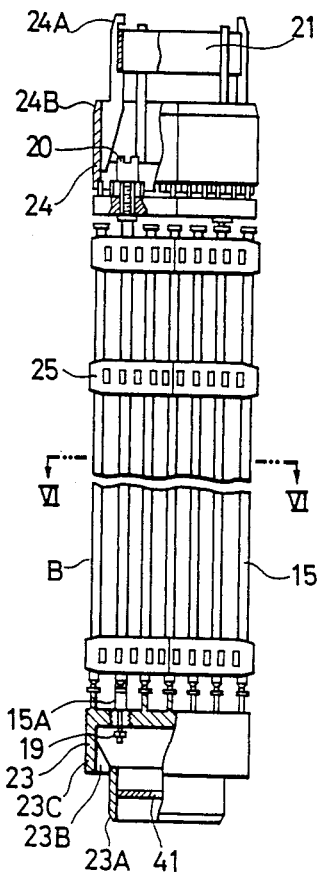
FIG. 5 is a side view of the fuel assembly which is charged in a peripheral area of FIG. 1.
Figure 6:
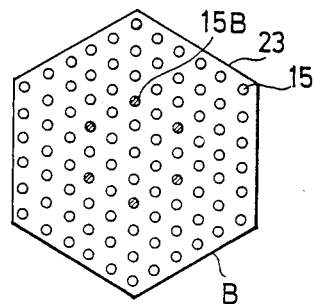
FIG. 6 is a cross section along a line VI—VI of FIG. 5.

The fuel assembly B includes, as shown in FIG. 5 and FIG. 6, a plurality of fuel rods 15 and a plurality of burnable poison rods 15B, a lower tie plate 23 and an upper tie plate 24 and spacers 25. In the fuel assembly B also its lower tie plate 23 and its upper tie plate 24 are connected respectively by the tie rods 15A which are a part of the fuel rods 15 as in the fuel assembly A.

The lower tie plate 23 has a cylindrical section 23A in its inside, and the cylindrical section 23 is connected to an outside cylindrical section 23C by means of a plurality of connecting plates 23B. Both ends of the fuel rods 15 and the burnable poison rods 15B are supported on the lower tie plate 23 and the upper tie plate 24 respectively. The fuel rods 15 (including the tie rods 15A) have the same construction as in the fuel assembly A.

The burnable poison rods 15B are filled with a mixture of the hydrogenerated zirconium as a moderator and gadolinium which is a burnable posion. The condensation distribution of the hydrogenerated zirconium and the gadolinium in the burnable poison rods 15B are axially uniform respectively.

The spacers 25 formed with a regular hexagon shape and hold the fuel rods 15 which are supported by the lower tie plates 17 and the upper tie plates 24 to form a regular hexagon bundle. Several spacers 25 are provided in the axial direction and prevent mutual contact of the fuel rods 15. In place of the burnable poison rods 15B the fuel rods 15 in which urainium dioxide (UO$_2$) pellets mixed with gadolinium are filled, may be provided in the fuel assembly B.

The distance among the adjacent fuel rods 15, that is, the rod pitch is larger in the fuel assembly B than that in the fuel assembly A. Accordingly the number of fuel rods 15 which constitute the fuel assembly B is smaller than the number of fuel rods 15 which constitute the fuel assembly A.

All of the horizontal cross-sectional areas (the cross-sectional area perpendicular to the axis of the fuel assembly) of the lower tie plates 16 and 23 and the upper tie plates 17 and 24 are the same.

The cylindrical section 16A of the fuel assembly A and the cylindrical section 23A of the fuel assembly B are inserted into the holes of the lower reactor core support plate 8, and the cylindrical section 16C of the fuel assembly A and the cylindrical section 23C of the fuel assembly B are installed respectively on the lower reactor core support plate 8.

The upper section 17A of the upper tie plate 17 for the fuel assembly A and the upper section 24A of the upper tie plate 24 for the fuel assembly B are inserted respectively into the holes in the upper reactor core support plate 9.

In this way the fuel assembly A and the fuel assembly B are supported respectively by the lower reactor core support plate 8 and the upper reactor core support plate 9. In the central area 27 the adjacent lower tie plate 16 and the upper tie plate 17 of the fuel assembly A are in contact with each other. The lower tie plate 16 and the upper tie plate 17 of the fuel assembly A which are located respectively at the utmost periphery of the central area 27 in contact with the inner face of the partition member 13.

In the peripheral area 28 also the adjacent lower tie plate 23 and the upper tie plate 24 of the fuel assembly B are in contact with each other. The lower tie plate 23 and the upper tie plate 24 of the fuel assembly B which is located respectively at the utmost inside of the peripheral area 28 are in contact with the outer face of the partition member 13.

Figure 7:
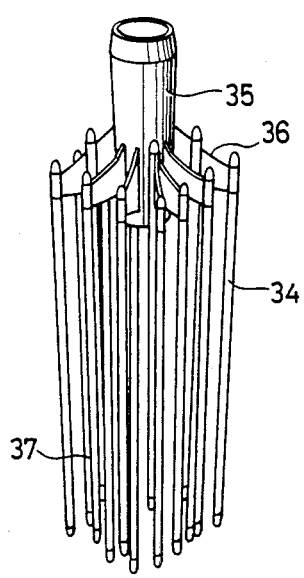
FIG. 7 is a perspective view of a control rod.

The pressurized water type nuclear reactor is provided with a control rod driving mechanism 29 which is operated by hydraulic pressure. The construction of the control rod driving mechanism 29 is the same as disclosed in U.S. Pat. No. 3,607,629. The control rod drive mechanism 29 is mounted on an upper flange 32 of an adaptor tube 31. The adaptor tube 31 not only pierces the sealed lid 5, but also is attached to the sealed lid 5 by welding. A control rod 34 shown in FIG. 7 is removably installed to the lower end of the control rod driving mechanism 29. The control rod 34 moves up and down in a guide tube 26.

The control rod 34 into the fuel assembly A and the fuel assembly B and also the operation to pull it out of them. The fuel assembly A and the fuel assembly B into which the control rod 34 is inserted are generally called a fuel assembly for control $A_o$ and a fuel assembly for control $B_o$ respectively. The fuel assembly for control $A_o$ and the fuel assembly for control $B_o$ are arranged in the reactor core 12. The fuel assembly for control $A_o$ and the fuel assembly for control $B_o$ include the fuel assembly A and the fuel assembly B by the proportion of three fuel assemblies A and one fuel assembly B, and are arranged coaxially with the guide tube 26 which is positioned right under the adaptor tube 31.

The construction of the control rod 34 will be explained with reference to FIG. 7. The control rod 34 comprises a main body 35 connected to the control rod driving mechanism 29, support members 36 attached radially to the main body 35, and neutron absorption rods 37 which are installed to the support members 36 at their end portions. The neutron absorption rod 37 is a sealed cladding tube which is filled with a neutron absorption material, boron carbide ($B_4C$).

Figure 8:
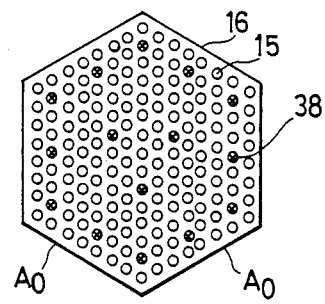
FIG. 8 is a horizontal cross section of the fuel assembly charged in the central area of FIG. 1.

Now the fuel assembly for control $A_o$ and the fuel assembly for control $B_o$ into which the control rod 34 is inserted will be explained. The fuel assembly for control $A_o$ is different from the fuel assembly A in that a plurality of hollow control guide tubes 38 are, as shown in FIG. 8, used in place of the tie rods 15A. The control guide tubes 38 connect the lower tie plate 16 and the upper tie plate 17.

Figure 9:
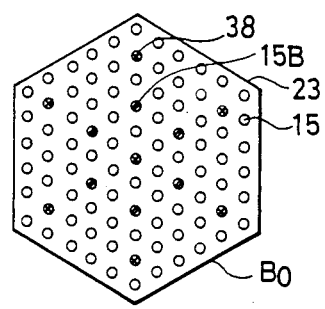
FIG. 9 is a horizontal cross section of the fuel assembly for control charged in the peripheral area of FIG. 1.

The fuel assembly for control $B_o$ is different from the fuel assembly B in which the plurality of hollow control guide tubes 38 are, as shown in FIG. 9, used in place of the tie rods 15A and connect the lower tie plate 23 and the upper tie plate 24.

The fuel rods 15 and the fuel assembly for control $B_o$ charged at the peripheral areas 28 are the fuel rods 15 which constitute the fuel assembly A and the fuel assembly for control $A_o$ and they had been burned for the specified period in the central area 27.

The rod number of in the fuel assembly B (including the fuel assembly for control $B_o$) which are charged in the peripheral area 28 is about twice as many as the rod number of in the fuel assembly A (including the fuel assembly for control $A_o$) which are charged in the central area 27. Namely the cross-sectional area in the peripheral area 28 is about twice as large as the cross-sectional area of the central area 27.

During the operation of the light water reactor the coolant (light water) which is sent from a steam generator (not shown) and also serves as a moderator enters the reactor pressure vessel 2 through the inlet nozzle 3. The coolant flows downwardly in an annular channel 39 which is formed between the reactor pressure vessel 2 and the reactor core shroud 6, and then the coolant flows into a lower plenum 40 which is formed below the lower reactor core support plate 8.

This coolant then passes through the cylindrical section 16A and the cylindrical section 23A of the lower tie plates 16 and the lower tie plates 23. The fuel assembly A and the fuel assembly for control $A_o$, and the fuel assembly B and the fuel assembly for control $B_o$ are supported respectively by the lower reactor core support plate 8. The coolant flows into each of the fuel assembly A and the fuel assembly B.

Since the number of the fuel rods 15 in the fuel assembly B and the fuel assembly for control $B_o$ is smaller than that of in the fuel assembly A and the fuel assembly for control $A_o$, the pressue loss in the fuel assembly B and the fuel assembly for control $B_o$ is smaller than that of in the fuel assembly A and the fuel assembly for control $A_o$. This condition makes it easier for the large quantity of the coolant to flow through the fuel assembly B and the fuel assembly for control $B_o$.

An orifice 41 is provided as shown in FIG. 5 in the cylindrical section 23A of the fuel assembly B and the fuel assembly for control $B_o$ respectively in order to make uniform the flow rate of the coolant that is supplied to both the central area 27 and the peripheral area 28. Since the upper reactor core support plate 9 is in contact with the upper end of the cylindrical section 24B of the upper tie plate 24, the fuel assembly B and the fuel assembly for control $B_o$ prevent respectively floating up.

The coolant is heated to the high temperature water in the process of ascending through the fuel assembly A and the fuel assembly B. The high temperature coolant discharged from the fuel assembly for control $A_o$ and the fuel assembly for control $B_o$ for control flows into the guide tube 26 which is located right above them and flows out from the opening 33 into the upper plenum 42 which is positioned above the upper reactor core support plate 9.

The rest of the high temperature coolant discharged from both the fuel assembly A and the fuel assembly B reaches the upper plenum 42 through the upper reactor core support plate 9.

The coolants which flow in the central area 27 and the peripheral area 28 do not mix in the reactor core 12 because of the existence of the partition member 13, but the coolants are mixed in the upper plenum 42. The high temperature coolant flows out of the reactor pressure vessel 2 from the upper plenum 42 through the outlet nozzle 4 and then the coolant is sent to the steam generator.

The control of the reactor output power is carried out by putting the neutron absorption rods 37 of the control rod 34 into the hollow control guide tubes 38 of the fuel assembly for control $A_o$ and the fuel assembly $B_o$ for control or pulling the control rod 34 out of the hollow control guide tubes 38.

In the embodiment explained above the average number of the fuel rods 15 (including the tie rods 15A) arranged in per unit area in the central area 27 is larger than the average number of the fuel rods 15 (including the tie rods 15A) arranged in per unit area in the peripheral area 28. Accordingly the average density of the fuel rods 15 in per unit area in the central area (the high conversion area) 27 is larger than the average density of the fuel rods 15 in per unit area in the peripheral area 28 (the burner area).

In the embodiment the average density of the fuel rods 15 in each of the central area 27 and the peripheral area 28 is set up so that the ratio (averge value) of the number of hydrogen atoms to that of fuel material atoms is about 1.0 in the central area 27 and the ratio (average value) of the number of hydrogen atoms to that of fuel material atoms is about 5.0 in the peripheral area 28.

Since the central area (the high conversion area) 27 has a small value, about 1.0 for the ratio of the number of hydrogen atoms to that of fuel material atoms, the central area (the high conversion area) 27 becomes a breeding area, making larger the conversion ratio from uranium 238 that is contained in uranium oxide ($UO_2$) pellets of the fuel rods 15 placed in the central area 27 to plutonium-239 during the operation of the light water reactor.

Since the peripheral area (the burner area) 28 has a large value, about 5.0 for the ratio of the number of hydrogen atoms to that of fuel material atoms, the peripheral area (the burner area) 28 becomes the burning area, making it possible to burn the fissile materials effectively by activated fission of fissile materials such as the uranium-235 or the plutonium-239 which are contained in uranium oxide ($UO_2$) pellets of the fuel rods 15 placed in the peripheral area 27 during the operation of the light water reactor.

Figure 10:
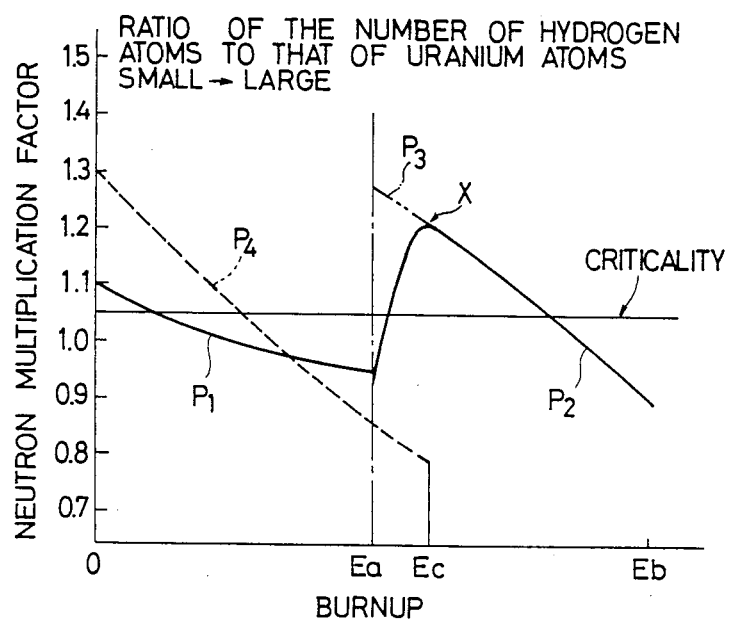
FIG. 10 and FIG. 11 are characteristics graphs showing the relationship between the burnup and the neutron multiplication factor, respectively.

The fuel rods 15 charged in the central area 27, that is, the fuel assembly A and the fuel assembly for control $A_o$ are charged in the central area 28 in the period from the burnup O to the burnup $E_a$ as shown in FIG. 10.

The neutron multiplication factors of the fuel assembly A and the fuel assembly for control $A_o$ drop as shown by the curve $P_1$ (solid line) of FIG. 10 as the burnup period elapses. The fuel rods 15 charged in the peripheral area 28, that is, the fuel assembly B and the fuel assembly for control $B_o$ are charged as shown in FIG. 10 in the peripheral area 28 during the period from the burnup $E_a$ to the burnup $E_b$.

The neutron multiplication factors of the fuel assembly B and the fuel assembly for control $B_o$ drop as shown by the curve $P_2$ (solid line) of FIG. 10 as the burnup period elapses. At the initial stage of the curve $P_2$, namely after passing the burnup $E_a$ the neutron multiplication factor increases towards a point X. It is because gadolinium in burnable poison rods 15B disappears gradually. The gadolinium disappears entirely at the point X.

The fuel assembly A and the fuel assembly for control $A_o$ which are charged in the central area 27 and have reached the burnup $E_a$ will find it difficult to continue burning in the central area 27 where the ratio of the number of hydrogen atoms to that of fuel material atoms is about 1.0, because their neutron multiplication is low.

For this reason the fuel rods 15 in the fuel assembly A and in the fuel assembly for control $A_o$ which have been charged in the central area 27 and reached the burnup $E_a$ are moved and charged in the peripheral area 28 while the light water reactor operation is stopped.

After this their burning is continued up to the burnup $E_b$ in the peripheral area 28 where the ratio of the number of hydrogen atoms to that of fuel material atoms is about 5.0.

The movement of the fuel rods 15 from the central area 27 to the peripheral area 28 is made under the condition that the fuel assembly A and the fuel assembly for control $A_o$ are disassembled and reassembled to become the fuel assembly B and the fuel assembly for control $B_o$.

This reassembly of the fuel assembly A and the fuel assembly for control $A_o$ to the fuel assembly B and the fuel assembly for control $B_o$ will be explained based on the fuel assembly A and the fuel assembly B.

The fuel assembly A which possesses the fuel rods 15 that have been charged in the central area 27 and reached the end of their life (have reached the burnup $E_a$) is taken out of from the reactor core 12 after the light water reactor stopped, and moved to a fuel pump (not shown) outside of the reactor pressure vessel 2. Namely, after the light water reactor operation has stopped, the sealed lid 5, the upper support plate 11 and the guide tube 26 are removed from the reactor pressure vessel 2.

The control rods 34 are separated from the control rod driving mechanism 29 and are inserted into the fuel assembly for control $A_o$ and the fuel assembly for control $B_o$. In this state the fuel assembly A which has reached the burnup $E_a$ is moved from the reactor core 12 to the fuel pool. The work to pull out the fuel assembly for control $A_o$ and the fuel assembly for control $B_o$ from the reactor core 12 is conducted after the control rod 34 in the reactor core is pulled out.

Then the tightening nut 20 of the fuel assembly A that has been moved to the fuel pool is removed, and after the upper tie plate 17 has been removed from the tie rods 15A, each of the fuel rods 15 is pulled out upwardly to be removed from the lower tie plate 16. After the nut 19 is removed, the tie rods 15A are removed from the lower tie plate 16. The spacers 18 are also removed from the tie rods 15A.

This disassembly work for the fuel assembly A is carried out in the water of the fuel pool by means of remote-controllable tools. The tie rods 15A which are removed in the disassembly work of the fuel assembly A are installed on the lower tie plate 23 which constitute the fuel assembly B and the nut 19 is installed to its lower end. The spacer 25 is already installed on the tie rods 15A.

The fuel rods 15 removed from the fuel assembly A are inserted into the spacers 25 and their lower ends are installed to the lower tie plate 23. The burnable poison rods 15B which are provided separately are inserted into the spacers 25 like the fuel rods 15 and installed to the lower tie plate 23.

The burnable poison rod 15B is effective to suppress the initial surplus reactivity of the fuel assembly B and the fuel assembly for control $B_o$ which are charged in the peripheral area 28 to the state before the point X on the curve $P_2$ shown in FIG. 10.

It is necessary because the fuel assembly B and the fuel assembly for control $B_o$ are charged in the area where the ratio of the number of hydrogen atoms to that of fuel material atoms is large.

The upper tie plate 24 pinches the fuel rods 15 and installs it by the tightening nut 20 to the tie rod 15A which is positioned on the side opposite to the lower tie plate 23.

When in place of the burnable poison rods 15B the fuel rods with pellets containing gadolinium are used, it is necessary that the composition of the fissile material in the fuel pellets of the fuel rod should be the same as the fissile material contained in the fuel rods 15 which constitute the fuel assembly at the burnup $E_a$. Out of one fuel assembly A two fuel assemblies B can be obtained.

The work of disassembling the fuel assembly for control $A_o$ and the disassembly work of the fuel assembly for control $B_o$ proceeds in the same way.

The fuel rods 15 (including the tie rods 15A) of the fuel assembly for control $A_o$ and the control guide tubes 38 can be reused for the fuel assembly for control $B_o$. The fuel rods 15 of the fuel assembly A can be used for the fuel assembly for control $B_o$ and the fuel rods 15 of the fuel assembly B can be used for the fuel assembly for control $A_o$.

When the fuel assembly A and the fuel assembly for control $A_o$ at the burnup $E_a$ are taken out of the central area 27, the fuel assembly B and the fuel assembly for control $B_o$ at the burnup $E_a$ are taken out of the peripheral area 28.

As stated above, the assembled fuel assembly B and fuel assembly for control $B_o$ is moved to the reactor pressure vessel 2 from the fuel pool and charged at the specified position in the peripheral area 28.

At the position in the central area 27 in which the fuel assembly A and the fuel assembly for control $A_o$ are taken out, the new fuel assembly A and the fuel assembly for control $A_o$ are charged. The fuel rods 15 which constitute those new fuel assembly A and fuel assembly for control $A_o$ are filled with the enriched uranium which has been produced by enriching natural uranium.

The fuel assembly B and the fuel assembly for control $B_o$ which have reached the burnup $E_b$ and are taken out of reactor core 12 are stored as the used fuel assemblies, and are not subjected to reprocessing.

The above described fuel assembly exchanges are conducted substantially once a year. Accordingly by a fuel exchange work once a year, one quarter of the fuel assembly A and the fuel assembly B are exchanged in the central area 27 and in the peripheral area 28, respectively.

After the new fuel assembly A and the fuel assembly for control $A_o$ and the reassembled fuel assembly B and fuel assembly for control $B_o$ are charged in the reactor core 12, the sealed lid 5, the upper support plate 11 and the guide tubes 26 are installed in the reactor pressure vessel 2, and the control rod driving mechanism 29 and the control rod 34 which have been separated are connected by the operation of the control rod driving mechanism 29. After this, the control rod 34 is pulled out of the reactor core 12 to raise the light water reactor power, and the operation of the light water reactor starts.

The fuel rods 15 once charged in the reactor core 12 are assembled into the fuel assembly A or the fuel assembly for control $A_o$ at first, then charged in the central area 27. The fuel rods 15 are burned as shwon by the curve $P_1$ shown in FIG. 10 to reach the burnup $E_a$.

During this burning, the conversion ratio increases in the fuel rods 15 as explained in the foregoing and a large amount of plutonium is accumulated in the fuel rods 15. Then the fuel rods 15 are taken out of the central area 27 and installed into the fuel assembly B or the fuel assembly for control $B_o$ to be charged in the peripheral area 28.

The fuel rods 15 are burned as shown by the curve $P_3$ (two-dot chain line, and after the point X merging to the curve $P_2$) of FIG. 10 to reach the burnup $E_b$. The fuel rods 15 that have reached the burnup $E_b$ are taken out of the peripheral area 28 and then the fuel rods 15 are subjected to the discharging treatment. In the embodiment the fissile materials filled in the fuel rods 15 are burned effectively without reprocessing.

The curve $P_4$ shown in FIG. 10 shows the variation in the neutron multiplication factor in the conventional pressurized water type nuclear reactor which has the uniform ratio (about 2.0) of the number of hydrogen atoms to that of fuel material atoms in the reactor core. The enrichment of the fuel rods charged for the first charged for the first time in the reactor core is equal to the enrichment of the fuel rods 15 in the embodiment of the present invention which is charged in the central area 27 for the first time. In the conventional light water reactor the fuel assemblies are exchanged for new fuel assemblies at the burnup $E_c$.

According to the present invention by which the production of plutonium is increased in the central area (the high conversion area) 27 and the fissile materials in the peripheral area (the burner area) 28 are burned with a high efficiency, the average burnup of the fuel rods 15 at which the fuel rods 15 are taken out is the burnup $E_b$, and the average burnup of the fuel rods 15 charged in the reactor core 12 of the conventional light water reactor is the burnup $E_c$.

If the amount of charged fuel in the embodiment which makes the average take-out burnup larger and the amount of charged fuel in the conventional light water reactor are the same, the reactor core 12 of the embodiment of the present invention is able to save uranium by $(E_b-E_a)/E_b$ in comparison with the reactor core of the conventional light water reactor.

When a burnup ratio $E_a/E_b$ is $\frac{2}{3}$, the uranium saving by the reactor core 12 of the embodiment of the present invention is 33% of the uranium used in the reactor core of the conventional light water reactor.

It is possible in the embodiment of the present invention to use the fuel effectively by the once-through method and, furthermore, the uranium saving is still achieved.

Figure 11:
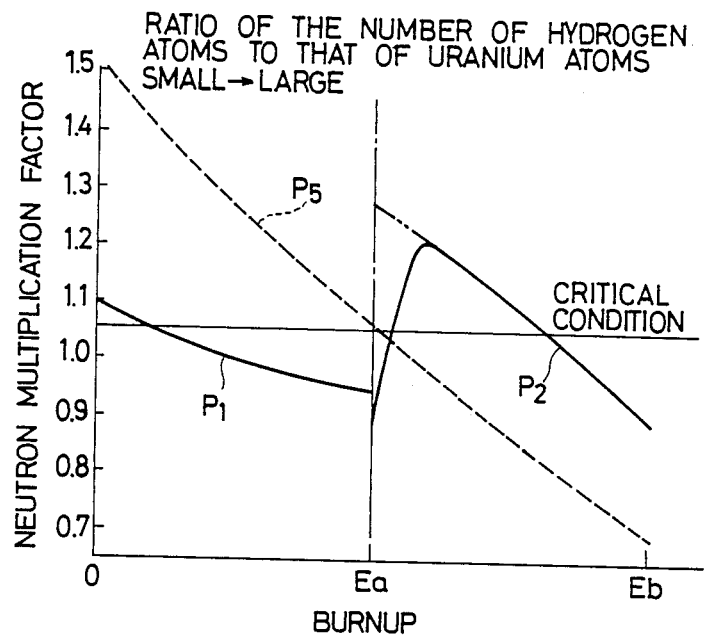
Figure 12:
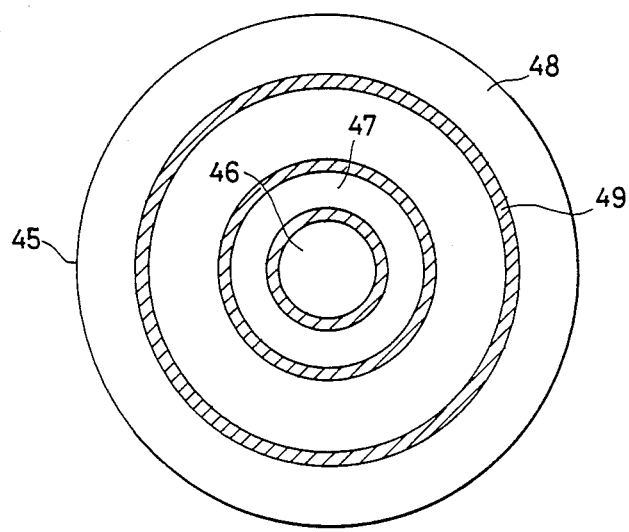
FIG. 12 is a diagram for explaining the principle and construction of a reactor core of a light water reactor according to the present invention.
Figure 13:
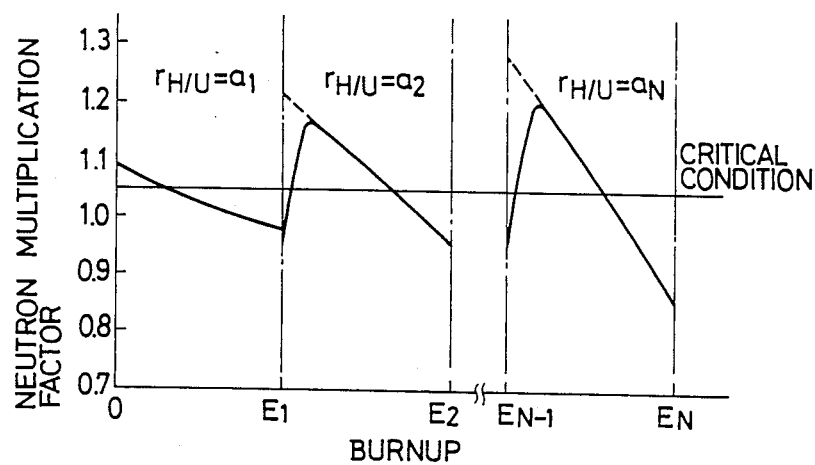
FIG. 13 is a characteristics graph showing the effects of present invention.
Figure 14:
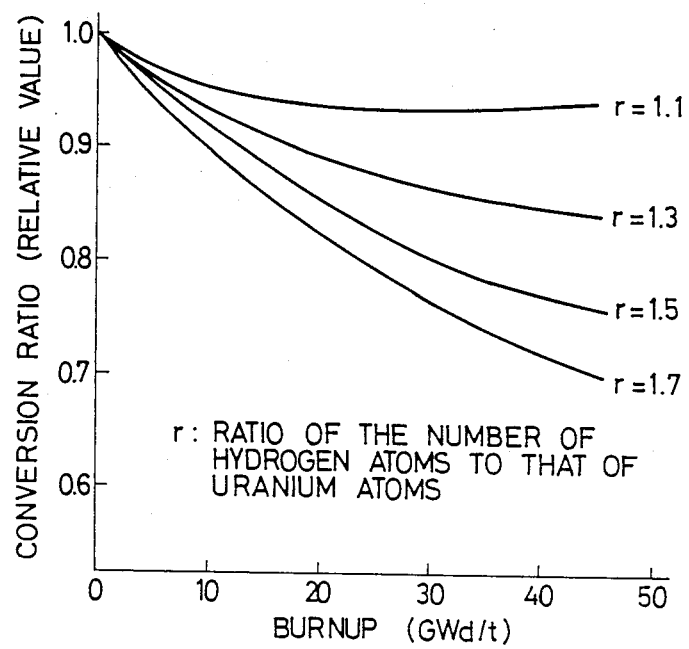
FIG. 14 is a characteristics graph showing the relation between the burnup and the conversion ratio.
Figure 15A:
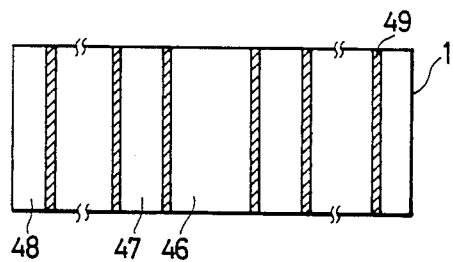
FIG. 15A, FIG. 15B and FIG. 15C are graphs for explaining the relationship between the power density and the coolant flow rate.
Figure 15B:
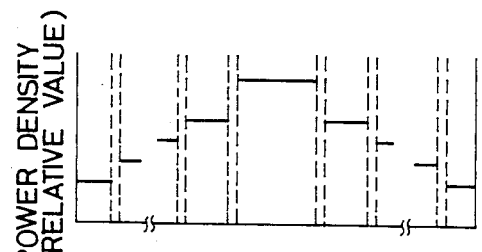
Figure 15C:
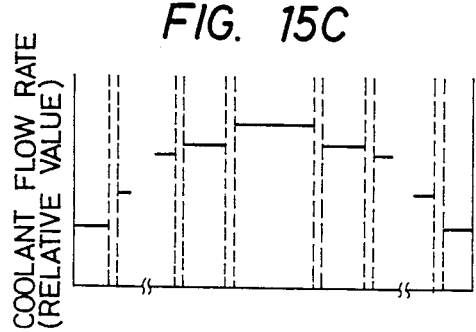

FIG. 11 compares the characteristics of the reactor core 12 of the embodiment of the present invention in FIG. 1 with those of the conventional reactor core using the fuel rods which have uniformly the ratio of the number of hydrogen atoms to that of fuel material atoms of about 2.0 and of which the initial enrichment of the fuel rods is raised to be able to reach the take-out burnup $E_b$ which is the take-out burnup of the embodiment of the present invention.

The characteristics of the conventional reactor core are represented by the curve $P_5$. With this conventional reactor core the initial neutron multiplication factor is large, and in order to suppress this the large amount of burnable poison material such as the gadolinium has to be put in the fuel assemblies at the expense of the neutron economy.

Furthermore, in the conventional light water reactor the mixing into the reactor core fuel assemblies which are much different in the neutron multiplication factor makes it difficult to flatten the output power distribution and the maximum burnup is, therefore, restricted by the fuel rods of peak output power with the result of the lowered average take-out burnup.

In the reactor core 12 of the embodiment of the present invention the mismatch in the neutron multiplication factors among the fuels is relatively small and the average take-out burnup can be made high.

Another embodiment of a boiling water type nuclear reactor which is a kind of light water reactor and to which the present invention is applied will be explained below.

Figure 16:
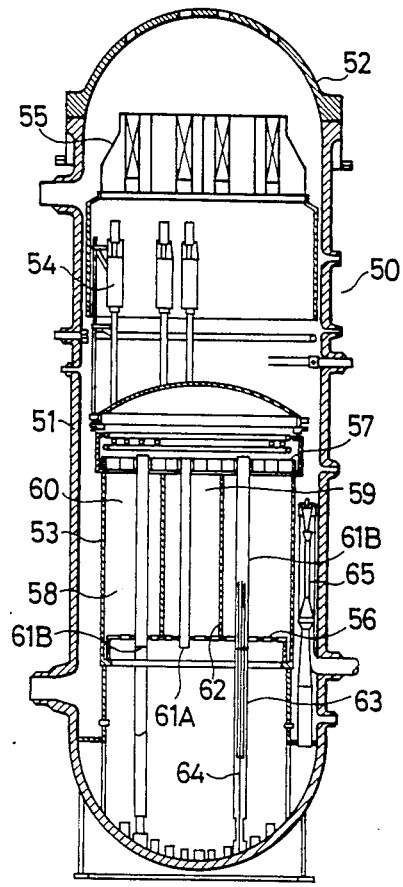
FIG. 16 is a vertical cross section of a boiling water type nuclear reactor which is another embodiment of the present invention.

FIG. 16 is a cross-sectional view of the boiling water type nuclear reactor according to the present invention. The boiling water type nuclear reactor 50 is provided with a nuclear reactor pressure vessel 51 which is tightly sealed by a sealed lid 52 at its top. A reactor core shroud 53 is installed in the reactor pressure vessel 51. A steam separator 54 is mounted on the top end of the reactor core shroud 53, and a dryer 55 located above the steam separator 54.

A lower reactor core support 56 and an upper reactor core support 57 are installed in the reactor core shroud 53. The upper section and lower section of a fuel assembly 61A and a fuel assembly 61B charged in the reactor core 58 are respectively supported by the lower reactor core support plate 56 and the upper reactor core support plate 57. A cylindrical partition member 62 is installed between the lower reactor core support plate 56 and the upper reactor core support plate 57. The partition member 62 divides the reactor core 58 radially into a central area (a high conversion area) 59 and a peripheral area (a burner area) 60.

The fuel assembly 61A is charged in the central area 59 and the fuel assembly 61B is charged in the peripheral area 60. The fuel assembly 61A includes the fuel assembly A shown in FIG. 3 and a hexagonal and cylindrical channel box attached to the fuel assembly A. The channel box encloses the outside of a bundle of the fuel rods 15 that is bound by spacers 18, and the upper end of the channel box is removably attached to the upper tie plate 17.

The fuel assembly 61B consists of the fuel assembly B shown in FIG. 5 and a hexagonal and cylindrical channel box which is attached removably to the fuel assembly 61B as the fuel assembly 61. This channel box encloses the outside of a bundle of the fuel rods 15 and the upper end of the channel box is removably attached to the upper tie plate 24.

Part of the fuel assembly 61A charged in the central area 59 is a fuel assembly for control, and this fuel assembly for control consists of a fuel assembly for control $A_o$ shown in FIG. 8 which has control rod guide tubes 38 and to which the channel box is removably attached. Part of the fuel assembly 61B charged in the peripheral area 60 is a fuel assembly for control, and this fuel assembly for control consists of a fuel assembly for control $B_o$ shown in FIG. 9 to which the channel box is removably attached.

The fuel assembly 61A, the fuel assembly for control and the fuel asembly 61B, the fuel assembly for control are arranged in the reactor core 58 as the reactor core 12 shown in FIG. 1. A jet pump 65 supplies to the reactor core 58 light water which is a coolant and also a moderator.

The average density of the fuel rods 15 per unit area in the central area 59 and the average density of fuel rod 15 per unit area in the peripheral area 60 are arranged as in the reactor core 12 shown in FIG. 1. The average density of the fuel rods 15 per unit in the central area 59 is larger than that of in the peripheral area 60. The ratio of the number of hydrogen atoms to that of fuel material atoms in each of the central area 59 and the peripheral area 60 is the same as in the core reactor 12 shown in FIG. 1.

A control rod driving mechanism (not shown) is attached to the cup-shaped bottom section of the reactor pressure vessel 51. A control rod guide tube 63 is provided in the reactor pressure vessel 51 and also is installed above the control rod driving mechanism and on the extension line through the control rod driving mechanism.

The lower end of a control rod 64 is removably connected to the control rod driving mechanism. The control rod 64 moves up and down in the control rod guide tube 63, and also has a plurality of absorber rods as the control rod 34. Those absorber rods extend upwardly. The absorber rod of each control rod 64 gets in and exits from the control rod guide tube 38 from under. The control rod guide tube 38 belongs to each of the fuel asssembly for control and the fuel assembly for control which are charged in the central area 59 and in the peripheral area 60.

When, as in the pressurized water type nuclear reactor described above as an embodiment of the present invention, the fuel assembly 61A charged in the central area 59 reaches the limit burnup $E_a$, the fuel rods 15 assembled in the fuel assembly 61A are removed from the fuel assembly 61A and used as constituents in the fuel assembly 61B.

The fuel rods 15 which constitute the fuel assembly 61B are, in turn, charged in the peripheral area 60 where the ratio of the number of hydrogen atoms to that of fuel material atoms is large and the burning of the fuel rods 15 continues to reach the burnup $E_b$.

In the embodiment also fuel materials can be utilized effectively in the once-through method as in the above mentioned embodiment, and furthermore the uranium saving can be achieved with this embodiment.

Figure 17:
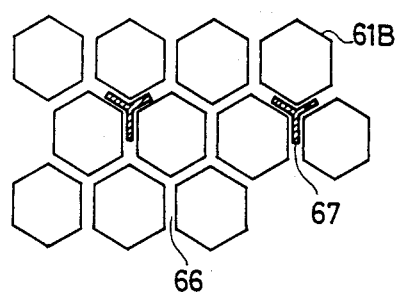
FIG. 17 is a diagram showing the construction of another embodiment of the peripheral area for the reactor core, shown in the boiling water type nuclear reactor of FIG. 16.

In the reactor core 58 of the embodiment shown in FIG. 16 the fuel assembly 61A and the fuel assembly 61B which are close to one another are arranged so that their channel boxes are in contact. As shown in FIG. 17, however, gaps 66 can be set up among the channel boxes which are adjacent to the fuel assembly 61B in the peripheral area 60.

In the gap 66 a control rod 67 connected to the control rod driving mechanism is inserted from under in place of the control rod 64. The control rod 67 from which a blade containing the absorber rod extends in three directions is used only in the peripheral area 60. The control rod 64 is inserted into the central area 59 as the above described embodiment but not into the peripheral area 60.

The average density of the fuel rods 15 per unit area in the peripheral area 60 is smaller than the average density of the fuel rods 15 in the peripheral area 60 of the embodiment shown in FIG. 16, because there are the gaps 66 among the fuel assemblies 61B. In this embodiment also the heat exchange in the above described embodiment is effected and achieved similarly.

Figure 18A:
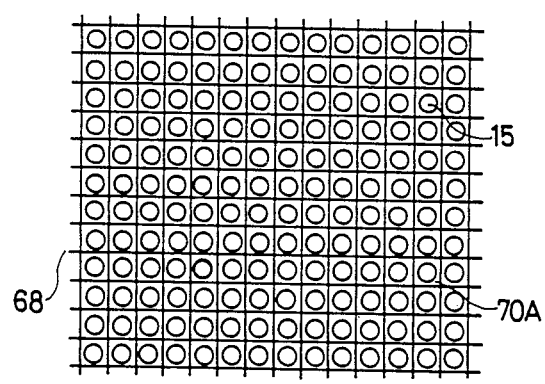
FIG. 18A shows a construction of an embodiment of the reactor core and shows an arrangement of the fuel assembly in the central area.
Figure 18B:
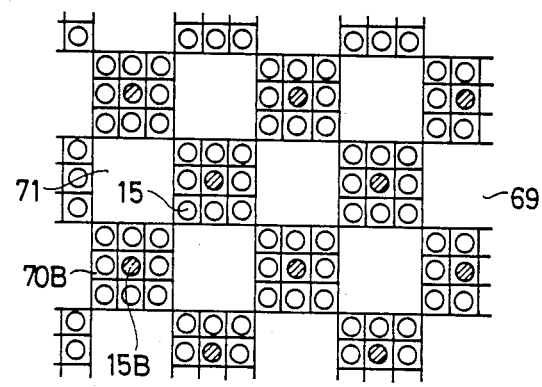
FIG. 18B shows a construction of an embodiment of the reactor core and shows the arrangement of the fuel assembly in the peripheral area.

Another embodiment of reactor core in the pressurized water type nuclear reactor is shown in FIG. 18A and FIG. 18B. The reactor core of the embodiment has the central area 68 shown in FIG. 18A and the peripheral area 69 shown in FIG. 18B. Both the central area 68 and the peripheral area 69 correspond respectively to the central area 27 and to the peripheral area 28 shown in FIG. 1. The peripheral area 69 encloses the central area 68. In the central area 68 many fuel assemblies 70A are arranged side by side. In the peripheral area 69 many fuel assemblies 70B are arranged side by side with the light water area 71 in between.

Figure 19:
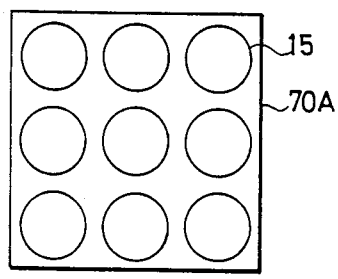
FIG. 19 is a horizontal cross section of the fuel assembly, shown in FIG. 18A.

The fuel assembly 70A has the fuel rods 15 arranged as shown in FIG. 19, and the fuel rods 15 are retained in the upper tie plate and in the lower tie plate. The fuel assembly 70B is the burnable poison rods 15B replacing the fuel rods 15 in the central area 68. There is the partition member above explained between the central area 68 and the peripheral area 69. Into the control rod guide tube of the specified fuel assembly 70A in the central area 68 the absorber rod for the control rod is inserted. The control rods are inserted into the light water areas 71 in the peripheral area 69.

Figure 20A:
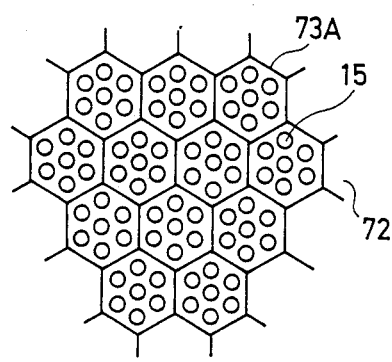
FIG. 20A shows a construction of other embodiment of the reactor core and shows an arrangement of the fuel assembly in the central area.
Figure 20B:
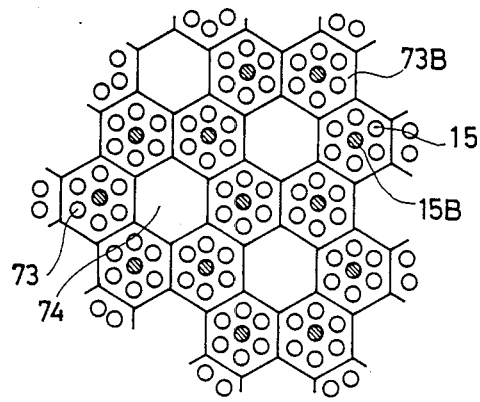
FIG. 20B shows a construction of other embodiment of the reactor core and shows the arrangement of the fuel assembly in the peripheral area.

FIG. 20A and FIG. 20B show another embodiment of the pressurized water type nuclear reactor. The reactor core of the embodiment has a central area 72 shown in FIG. 20A and a peripheral area 73 shown in FIG. 20B. The central area (the high conversion area) 72 and the peripheral area (the burner area) 73 correspond respectively to the central area 27 and to the peripheral area 28 shown in FIG. 1. The peripheral area 73 encloses the central area 72. The central area 72 and the peripheral area 73 are divided by the partition member as described above. In the central area 72 many fuel assemblies 73A are arranged side by side. In the peripheral area 73 there are light water areas 74 among the fuel assemblies 73B.

Figure 21:
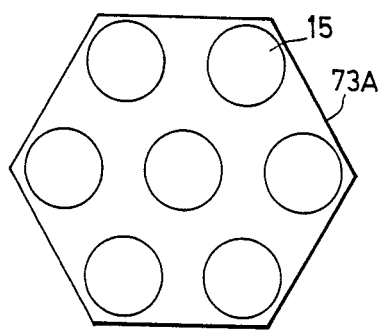
FIG. 21 is a horizontal cross section of the fuel assembly shown in FIG. 20A.

The fuel assembly 73A has the fuel rods 15 arranged as shown in FIG. 21. Both ends of the fuel rods 15 are retained in an upper tie plate and an lower tie plate. The fuel assembly 73A is the burnable poison rod replacing the fuel rods 15. The absorber rod of the control rod is inserted into the control rod guide tube of the specified fuel assembly 73A in the central area 72. The control rod is inserted into the specified light water area 74 in the peripheral area 73.

Each of the fuel assemblies 70A and 73A and the fuel assemblies 70B and 73B arranged in the recator core shown in FIG. 18A, FIG. 18B and FIG. 20A, FIG. 20B is exceedingly smaller than the fuel assembly A and fuel assembly B charged in the reactor core 12 of FIG. 1.

In the reactor core of FIG. 18A, FIG. 18B, FIG. 20A and FIG. 20B, the average density of fuel rod per unit area in the peripheral areas 69 or 73 is smaller than the average density in the central area 68 or 72 because of the existence of the light water areas 71 or 74.

The ratio of the number of hydrogen atoms to that of fuel material atoms is about 1.0 in the central area 68 or 72 and is about 5.0 in the peripheral area 69 or 73.

Figure 2:
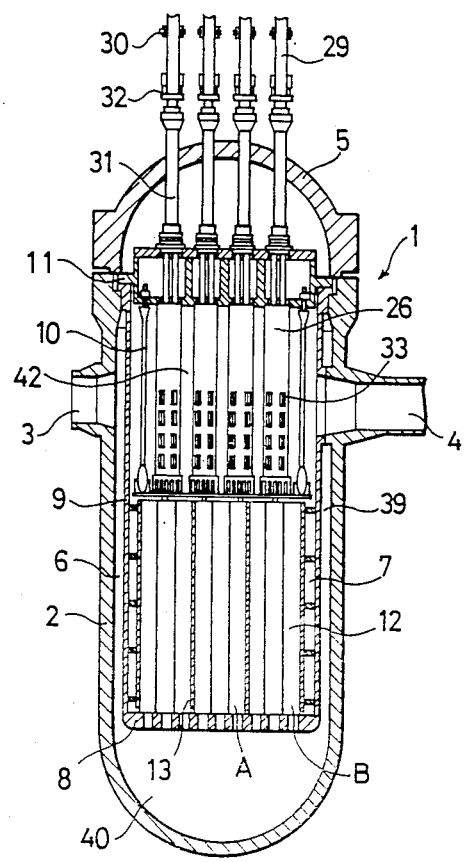
FIG. 2 is a vertical cross section of a preferred embodiment of the present invention which includes the reactor core shown in FIG. 1.

In the pressurized water type nuclear reactor with the reactor core shown in FIG. 18A, FIG. 18B, FIG. 20A and FIG. 20B, the fuel assembly 70A and the fuel assembly 73A are disassembled when they reach the specified burnup $E_a$ as with the pressurized water type nuclear reactor shown in FIG. 1 and FIG. 2, and the fuel rods 15 are removed. Those fuel rods 15 and the burnable poison rods 15B are assembled to form the fuel assembly 70B and the fuel assembly 73A. The assembled fuel assembly 70B and the fuel assembly 73A are charged respectively in the peripheral areas 69 and 73.

Accordingly the control rod once charged in the light water reactor can be burned up to the burnup $E_b$ as for the embodiment shown in FIG. 2. The take-out burnup for the embodiment is exceedingly increased as in the embodiment shown in FIG. 2 in comparison with the conventional light water reactor. This allows effective utilization of the fuel materials and the uranium saving.

Furthermore, the effects (1)–(3) listed below are obtained by using the small size fuel assemblies as in the reactor core of FIG. 18A, FIG. 18B and FIG. 20A and FIG. 20B.

(1) Minute adjustment of the ratio of the number of hydrogen atoms to that fuel material atoms can be made by adjusting the number of the fuel rods charged per unit cross-sectional area in the reactor core.

(2) In the peripheral area, if the fuel assembly is removed, it leaves a light water gap area, but its width is not made any wider than necessary.

(3) The fuel rods in the peripheral area can face the light water gap area except for the fuel assembly, and this makes it possible to utilize the thermal neutrons effectively.

Figure 22:
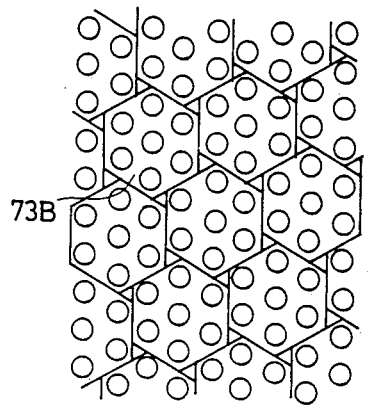
FIG. 22 is a diagram showing the arrangement of the fuel assembly in another embodiment.

FIG. 22 shows another embodiment of the peripheral area 73 which employs the fuel assembly 73B. With the arrangement of the fuel assembly such as the fuel assembly 73B, the fuel rods are positioned with the equal distance among the fuel assemblies 73B.

The reactor core construction in the pressurized water type nuclear reactor shown in FIG. 18A, FIG. 18B, FIG. 20A and FIG. 20B can be achieved the reactor core in the boiled water type nuclear reactor as well.

Figure 23:
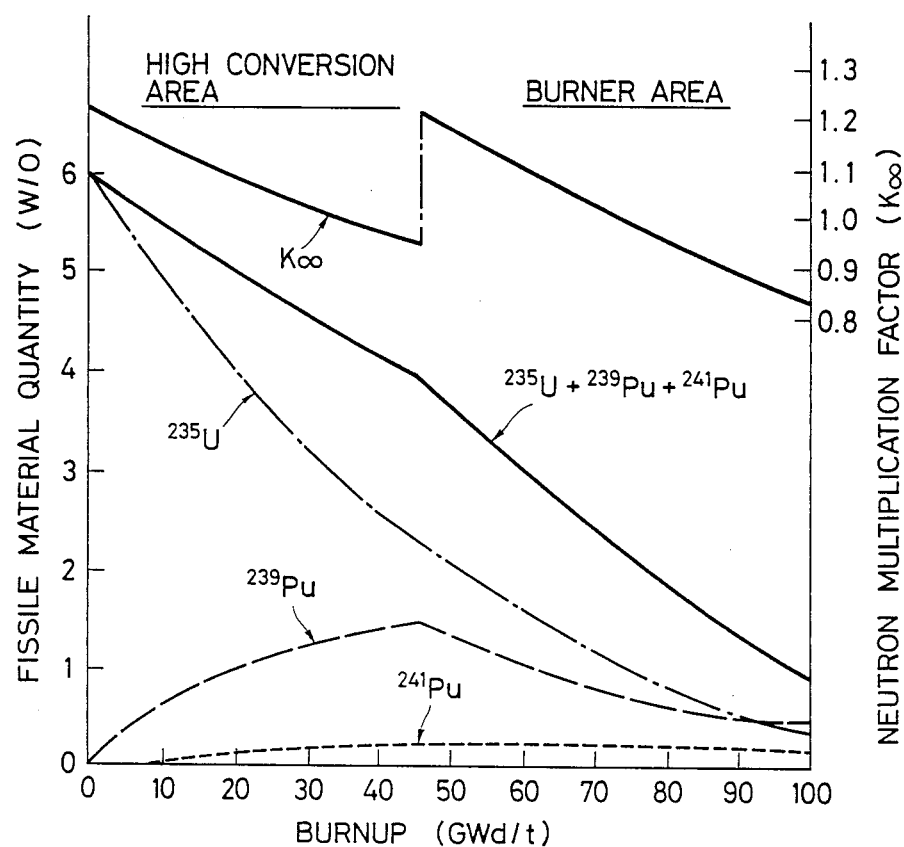
FIG. 23 is a characteristics graph showing the mutual relationship between the burnup and the fissile material quantity and also showing the mutual relation between the burnup and the neutron multiplication factor.

FIG. 23 shows the mutual relationship between the change of the fissile material, quantity (W/O) and the change of the burnup; and also the mutual relationship between the change of the neutron multiplication (K ∞ ) and the change of the burnup in an embodiment of the present invention.

The reactor core of the embodiment shown in FIG. 23 is divided into two areas, that is, one high coversion area (a central area) and one burner area (a peripheral area).

The established conditions of the embodiment shown in FIG. 23 are as follows; (1) The initial concentration of the fissile material quantity (W/O) is 6%; (2) the reactor core is divided into the high conversion area and the burner area, and the burner area starts when the burnup reaches at the condition of the burnup 45 GWd/t or 45%; (3−a) the ratio ($V_H/V_F$) of the volume of light water and the volume of fissile material in the high conversion area is about 0.9, and the ratio ($V_H/V_F$) of the volume of light water and the volume of fissile material in the burner area is about 2.2; or (3−b) the ratio ($r_{H/U}$) of the number of hydrogen atoms and the number of fuel material atoms in the high conversion area is about 2.0, and the ratio ($r_{H/U}$) of the number of hydrogen atoms and the number of fuel material atoms in the burner area is about 5.0.

In the high conversion area plutonium is generated and accumulated therein, and in the burner area the activated fissile material moved from the high conversion area is burned effectively. Thus the burnup attains a high value as about 100 GWd/t.

Besides in the conventional light water reactor, the initial concntration of the fissile material quantity (W/O) is about 3%, and the burnup is about 30 GWd/t. Even if the initial concentration of the fissile material quantity (W/O) were about 6%, the burnup would reach not more than about 60 GWd/t in the conventional light water reactor.

In comparison with to the burnup of the conventioanl light water, the burnup of the above embodiment of the present invention can be obtained highly about twice value.

Furthermore, the ratio ($V_H/V_F$) of the volume of light water and the volume of fuel material in the high conversion area of the embodiment of the present invention is raised to about 0.9.

In the comparison with to the value 0.5 for the ratio ($V_H/V_F$) of the volume of light water and the volume of fuel material in the high conversion reactor (HCR), the above value 0.9 for the ratio ($V_H/V_F$) of the volume light water and the volume of fuel material in the embodiment can reach about twice value. Therefore, the pressure drop in the reactor core of the present invention makes to lower and also the problems raised from the aspects of the heat transfer or the floating can be settled comparatively easily.

Still further, in the above embodiment of the present invention, the fuel rods used in the burner area do not contain gadolinia. It is possible to use in the burners area the fuel rods not containing gadolinia, and to obtain the high burnup without the fuel rods not containing gadolium.

In above embodiment, the burner area starts when the burnup reaches at the condition of the burnup 45%. Therefore the mismatch in the neutron indifinite multiplication factor can be to smaller. However the burner area may start at the range of the condition of the burnup about 40–50%.

We claim:

1. A method of constructing a light water moderation type nuclear reactor comprising the steps of:
    dividing a reactor core having a plurality of different areas in a radial direction of the reactor core and through which light water flows;
    providing a plurality of fuel assemblies, each of the fuel assemblies comprising a plurality of fuel rods arranged therein;

arranging the plurality of fuel assemblies of fuel rods in the reactor core so that each of the different areas having fuel assemblies with fuel rods arranged therein have different average densities of the fuel rods per unit cross-sectional area of a fuel assembly;

forming the fuel rods of a fuel assembly in a first different area so as to have a larger average density of the fuel rods per unit cross-sectional area of the fuel assembly than the average density of the fuel rods per unit cross-sectional area of the fuel assembly of the fuel rods of a fuel assembly arranged in a second different area and forming the fuel rods of the fuel assembly arranged in the second different area to have a smaller average density of the fuel rods per unit cross-sectional area of the fuel assembly than the fuel rods of the fuel assembly of the first different area;

wherein the step of forming fuel rods of the fuel assemblies of different areas with different average densities of the fuel rods per unit cross-sectional area of a fuel assembly includes burning the fuel rods having fuel therein of the fuel assembly having the larger average density of the fuel rods per unit cross-sectional area of the fuel assembly in the first different area and thereafter constructing a fuel assembly for the second different area by utilizing the fuel rods of the fuel assembly previously burned in the first different area without treatment of the fuel of the fuel rods and positioning the fuel rods within the fuel assembly of the second different area so as to have a smaller average density of the fuel rods per unit cross-sectional area.

2. A method according to claim 1, wherein the fuel assembly arranged in the first different area has a cross-sectional area substantially equal to the fuel assembly arranged in the second different area, and the number of fuel rods in the fuel assembly in the second different area is smaller than the number of fuel rods in the fuel assembly in the first different area.

3. A method according to claim 1, wherein the first different area is a central region of the reactor core and the second different area is a peripheral region of the reactor core radially disposed outside of the central region.

4. A light water moderation type nuclear reactor comprising a reactor core through which light water flows, a plurality of fuel assemblies arranged in the reactor core, each of the fuel assemblies comprising a plurality of fuel rods arranged therein, and a plurality of different areas provided within the reactor core in a radial direction of the reactor core, each of said different areas having fuel assemblies with fuel rods arranged therein having different average densities of the fuel rods per unit cross-sectional area of a fuel assembly, the fuel rods of a fuel assembly in a first different area having a larger average density of the fuel rods per unit cross-sectional area of the fuel assembly than the average density of the fuel rods per unit cross-sectional area of the fuel assembly of the fuel rods of a fuel assembly arranged in a second different area, the fuel rods of the fuel assembly arranged in the second different area with a smaller average density of the fuel rods per unit cross-sectional area of the fuel assembly than the fuel rods of the fuel assembly of the first different area being fuel rods of a fuel assembly having fuel therein previously burned in the first different area and moved into a fuel assembly of the second different area without treatment of the fuel of the fuel rods.

5. A light water moderation type nuclear reactor according to claim 4, wherein the first different area is disposed at a central region of the reactor core and the second different area is disposed at a peripheral region in a radial direction of the reactor core outside of the first different area.

6. A light water moderation type nuclear reactor according to claim 4, wherein a ratio ($V_H/V_F$) of the volume of light water and the volume of fuel material in the second different area is larger than a ratio ($V_H/V_F$) of the volume of light water and the volume of fuel material in the first different area.

7. A light water moderation type nuclear reactor comprising a reactor core through which light water flows, fuel assemblies of fuel rods arranged in the reactor core each of the fuel assemblies comprising a plurality of fuel rods arranged therein, and a plurality of different areas provided within the reactor core in a radial direction of the reactor core, each of said different areas having the fuel assemblies with fuel rods arranged therein having different ratios ($r_{H/U}$) of the number of hydrogen atoms to the number of fuel material atoms, the fuel rods of a fuel assembly arranged in a first different area having the ratio ($r_{H/U}$) of the number of hydrogen atoms to the number of fuel material atoms which is smaller than the ratio ($r_{H/U}$) of the fuel rods of a fuel assembly arranged in a second different area, the fuel rods of the fuel assembly arranged in said second different area having a larger ratio ($r_{H/U}$) than the ratio ($r_{H/U}$) of the fuel rods of the fuel assembly arranged in said first different area being fuel rods of the fuel assembly having fuel therein previously disposed and burned in said first different area and moved into the fuel assembly disposed in said second different area without treatment of the fuel of the fuel rods.

8. A light water moderation type nuclear reactor according to claim 7, wherein the first different area is arranged at a central region of the reactor core and the second different area is arranged at a peripheral region in a radial direction of the reactor core outside of the region.

9. A light water moderation type nuclear reactor according to claim 7, wherein the fuel assemblies of fuel rods arranged in the reactor core include at least one first fuel assembly formed of a pluraliy of fuel rods and arranged in said first different area and at least one second fuel assembly formed of a plurality of fuel rods and arranged in said second different area, the fuel rods of said second assembly arranged in said second area having a distance between the fuel rods thereof which is larger than a distance between the fuel rods of said first assembly arranged in said first different area.

10. A light water moderation type nuclear reactor according to claim 7, wherein the fuel assemblies of fuel rods arranged in a reactor core include a plurality of first fuel assemblies having a plurality of fuel rods and arranged in said first different area, and a plurality of second fuel assemblies formed of a plurality of fuel rods and arranged in said second different area, said second fuel assemblies arranged in said second different area having a distance therebetween which is larger than a distance between said first fuel assemblies arranged in said first different area.

11. A light water moderation type nuclear reactor according to claim 7, wherein the the fuel assemblies of fuel rods arranged in the reactor core include at least one first fuel assembly formed of a plurality of fuel rods and arranged in said first different area, and at least one second fuel assembly formed of a plurality of said fuel rods and arranged in said second different area, and a plurality of light water areas provided in said second different area so as to arrange said at least one second fuel assembly therein.

12. A light water moderation type nuclear reactor according to claim 7, wherein said fuel assemblies of fuel rods arranged in the reactor core include at least one first fuel assembly formed of a pluraliy of fuel rods and arranged in said first different area, and at least one second fuel assembly formed of a plurality of fuel rods and being arranged in said second different area, said at least one second fuel assembly including at least one rod composed of a neutron moderator.

13. A light water moderation type nuclear reactor according to claim 7, wherein a ratio ($V_H/V_F$) of the volume of light water and the volume of fuel material in the second different area is larger than a ratio ($V_H/F_F$) of the volume of light water and the volume of fuel material in the first different area.

14. A light water moderation type nuclear reactor comprising a reactor core through which light water flows, a plurality of fuel assemblies arranged in the reactor core, each of the fuel assemblies having a plurality of fuel rods arranged therein, the reactor core being divided into at least a central area and a peripheral area in a radial direction of the reactor core, said plurality of fuel assemblies including at least one first fuel assembly arranged in said central area and at least one second fuel assembly arranged in said peripheral area, said fuel rods of said first fuel assembly arranged in said central area having a ratio ($r_{H/U}$) of the number of hydrogen atoms to the number of fuel materials atoms which is smaller than a ratio ($r_{H/U}$) of the number of hydrogen atoms to the number of fuel material atoms of said fuel rods of said second fuel assembly arranged in said peripheral area, the fuel rods of said second fuel assembly being fuel rods having fuel therein which have been previously disposed and burned in said first fuel assembly, in said central area and moved into said second fuel assembly in said peripheral area without treatment of the fuel of the fuel rods.

15. A light water moderation type nuclear reactor according to claim 14, wherein a cross-sectional area of said peripheral area is about 2.0 as large as a cross-sectional area of said central area.

16. A light water moderation type nuclear reactor according to claim 14, wherein a number of fuel rods in said first fuel assembly is about 2.0 as many as a number of fuel rods in said second fuel assembly.

17. A light water moderation type nuclear reactor according to claim 14, wherein said fuel rods of said first fuel assembly in said central are have an average density of fuel rods per unit cross-sectional area of said first fuel assembly so that the ratio of the number of hydrogen atoms to the number of fuel material atoms thereof is about 1.0–2.0, and the fuel rods of said second fuel assembly have an average density of fuel rods per unit cross-sectional area of said second fuel assembly in said peripheral area so that the ratio of the number of hydrogen atoms to the number of fuel material atoms is about 5.0.

18. A light water moderation type nuclear reactor according to claim 14, wherein said second fuel assembly in said peripheral area includes a channel box and a gap is provided among channel boxes adjacent to said second fuel assemblies in said peripheral area.

19. A light water moderation type nuclear reactor according to claim 14, wherein a plurality of said second fuel assemblies are provided in said peripheral area and are arranged side-by-side with a plurality of light water areas.

20. A light water moderation type nuclear reactor according to claim 14, wherein a plurality of second fuel assemblies are provided in said peripheral area and are arranged with a plurality of light water areas therebetween.

21. A light water moderation type nuclear reactor according to claim 14, wherein a ratio ($V_H/V_F$) of the volume of light water and the volume of fuel material in said peripheral area is larger than a ratio ($V_H/V_F$) of the volume of light water and the volume of fuel material in said central area.

22. A light water moderation type nuclear reactor according to claim 14, wherein at least one partition member is provided in the reactor core for dividing the reactor core into at least said central area and said peripheral area.

* * * * *